US012571508B2

(12) United States Patent
Marcucci et al.

(10) Patent No.: US 12,571,508 B2
(45) Date of Patent: Mar. 10, 2026

(54) REMOVEABLE POWER SOURCE AND LIGHTING DEVICE

(71) Applicant: Alliance Sports Group, L.P., Roanoke, TX (US)

(72) Inventors: Todd Lee Marcucci, Mansfield, TX (US); Yu Xin, Ningbo (CN)

(73) Assignee: Alliance Sports Group, L.P., Roanoke, TX (US)

( * ) Notice: Subject to any disclaimer, the term of this patent is extended or adjusted under 35 U.S.C. 154(b) by 0 days.

(21) Appl. No.: 19/081,937

(22) Filed: Mar. 17, 2025

(65) Prior Publication Data

US 2025/0305646 A1 Oct. 2, 2025

Related U.S. Application Data

(60) Provisional application No. 63/572,539, filed on Apr. 1, 2024.

(51) Int. Cl.
F21L 4/08 (2006.01)
H01M 50/247 (2021.01)
H01M 50/296 (2021.01)

(52) U.S. Cl.
CPC ........... F21L 4/085 (2013.01); H01M 50/247 (2021.01); H01M 50/296 (2021.01); H01M 2220/30 (2013.01)

(58) Field of Classification Search
CPC . H01M 50/247; H01M 50/213; H01M 50/202
See application file for complete search history.

(56) References Cited

U.S. PATENT DOCUMENTS

| | | | |
|---|---|---|---|
| 9,843,208 B2 | 12/2017 | Inskeep | |
| 11,639,789 B2 | 5/2023 | Sharrah et al. | |
| 12,146,624 B2 * | 11/2024 | Kaye | F21L 4/085 |
| 12,158,249 B1 * | 12/2024 | Bertken | F21L 4/005 |
| 12,196,381 B1 * | 1/2025 | Bertken | F21L 4/085 |
| 12,313,228 B1 * | 5/2025 | Bertken | F21L 4/085 |
| 12,392,459 B2 * | 8/2025 | Kaye | F21V 23/0414 |
| 2011/0068741 A1 * | 3/2011 | Liu | F21V 33/00 |
| | | | 362/183 |
| 2013/0343042 A1 * | 12/2013 | Windom | F21L 4/005 |
| | | | 362/183 |
| 2018/0259136 A1 * | 9/2018 | Horne | F21V 23/0414 |

(Continued)

FOREIGN PATENT DOCUMENTS

| | | | | |
|---|---|---|---|---|
| AU | 2013277223 A1 * | 1/2015 | ......... | H01M 10/488 |
| WO | WO 2022155027 A1 | 7/2022 | | |

OTHER PUBLICATIONS

U.S. Appl. No. 29/928,607, N/A, Marcucci et al.

(Continued)

*Primary Examiner* — Alexander K Garlen
(74) *Attorney, Agent, or Firm* — Thorpe North & Western, LLP.; Jed H. Hansen

(57) ABSTRACT

A light source having a body with a cavity is disclosed. A rechargeable power source is disposed within the cavity of the body. The rechargeable power source has a first end and a second end. The first end of the rechargeable power source has a symmetric shape with a plurality of finite orientations shaped to fit into a portion of the body. The portion of the body is shaped to correspond to the symmetric shape of the rechargeable power source.

20 Claims, 11 Drawing Sheets

(56) References Cited

U.S. PATENT DOCUMENTS

| | | | |
|---|---|---|---|
| 2021/0048182 A1* | 2/2021 | Sharrah | H01M 50/247 |
| 2022/0221143 A1* | 7/2022 | Sharrah | F21V 17/005 |
| 2023/0324015 A1* | 10/2023 | Kaye | F21V 23/04 |
| 2025/0035272 A1* | 1/2025 | Kaye | F21V 23/0414 |

OTHER PUBLICATIONS

U.S. Appl. No. 18/811,546, filed Dec. 3, 2024, Bertken.
U.S. Appl. No. 18/591,790, filed Sep. 10, 2024, Bertken.
U.S. Appl. No. 19/009,815, filed May 27, 2025, Bertken.
U.S. Appl. No. 18/917,346, filed Jan. 14, 2025, Bertken.

* cited by examiner

REMOVEABLE POWER SOURCE AND LIGHTING DEVICE

PRIORITY CLAIM

The present application claims priority to U.S. Ser. No. 63/572,539 filed Apr. 1, 2024 entitled "Removeable Power Source and Flashlight" which is incorporated herein by reference in its entirety.

FIELD OF THE DISCLOSURE

This disclosure relates generally to any device with a rechargeable power source, and more particularly to a lighting device with a removable rechargeable power source, including, but without limitation, hand-held lights, work lights, headlamps, and the like.

BRIEF DESCRIPTION OF THE DRAWINGS

Technology embodiments will become more fully apparent from the following description, taken in conjunction with the accompanying drawings. It is to be understood that these drawings merely depict exemplary technology embodiments and are not to be considered limiting of the disclosure's scope. It will be readily appreciated that the components of the embodiments, as generally described and illustrated in the figures herein, could be arranged and designed in a wide variety of different configurations. Nonetheless, the technology will be described and explained with additional specificity and detail through the use of the accompanying drawings in which.

DESCRIPTION OF ASPECTS OF THE TECHNOLOGY

Figure 1:
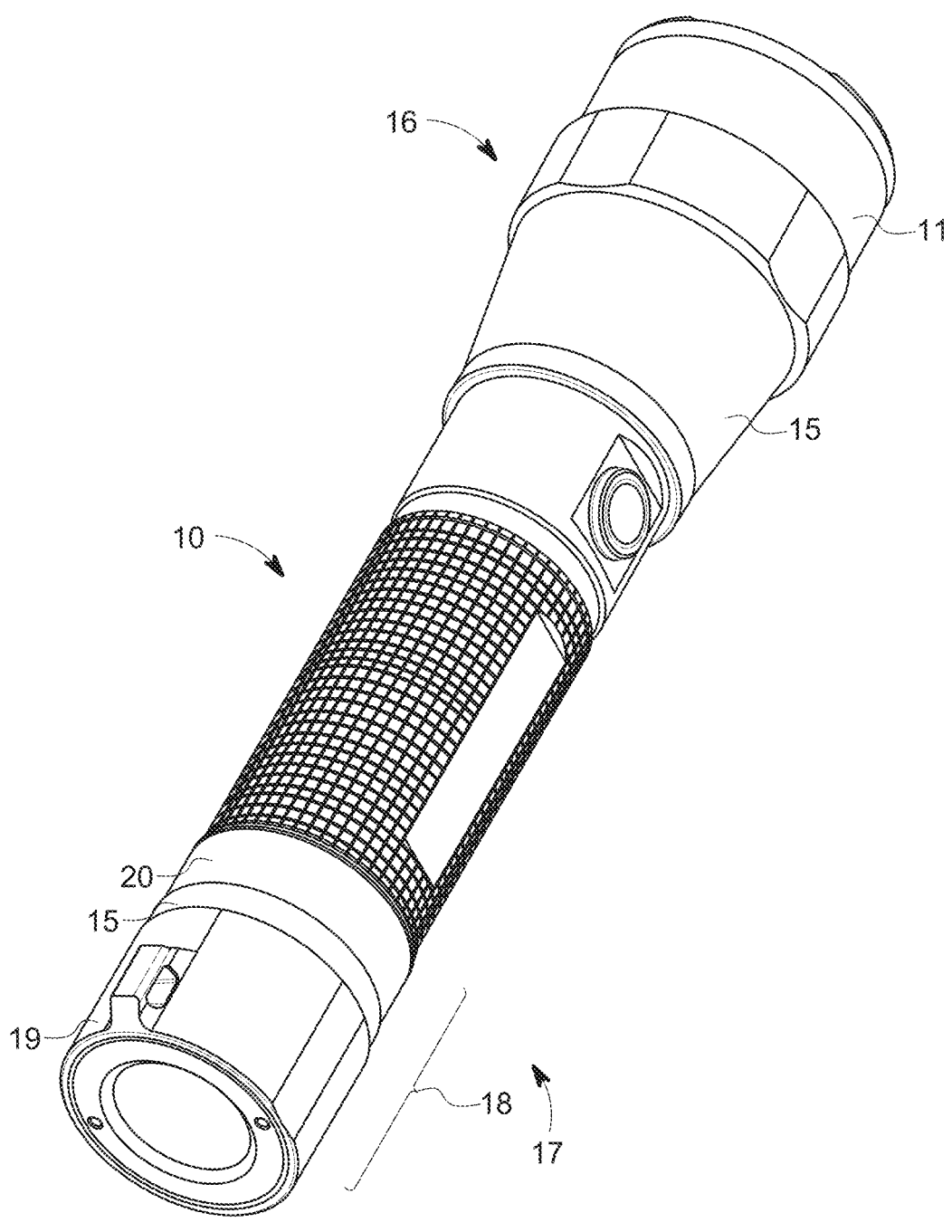
FIG. 1 is a perspective view of a handheld lighting device in accordance with one aspect of the technology.
Figure 2:
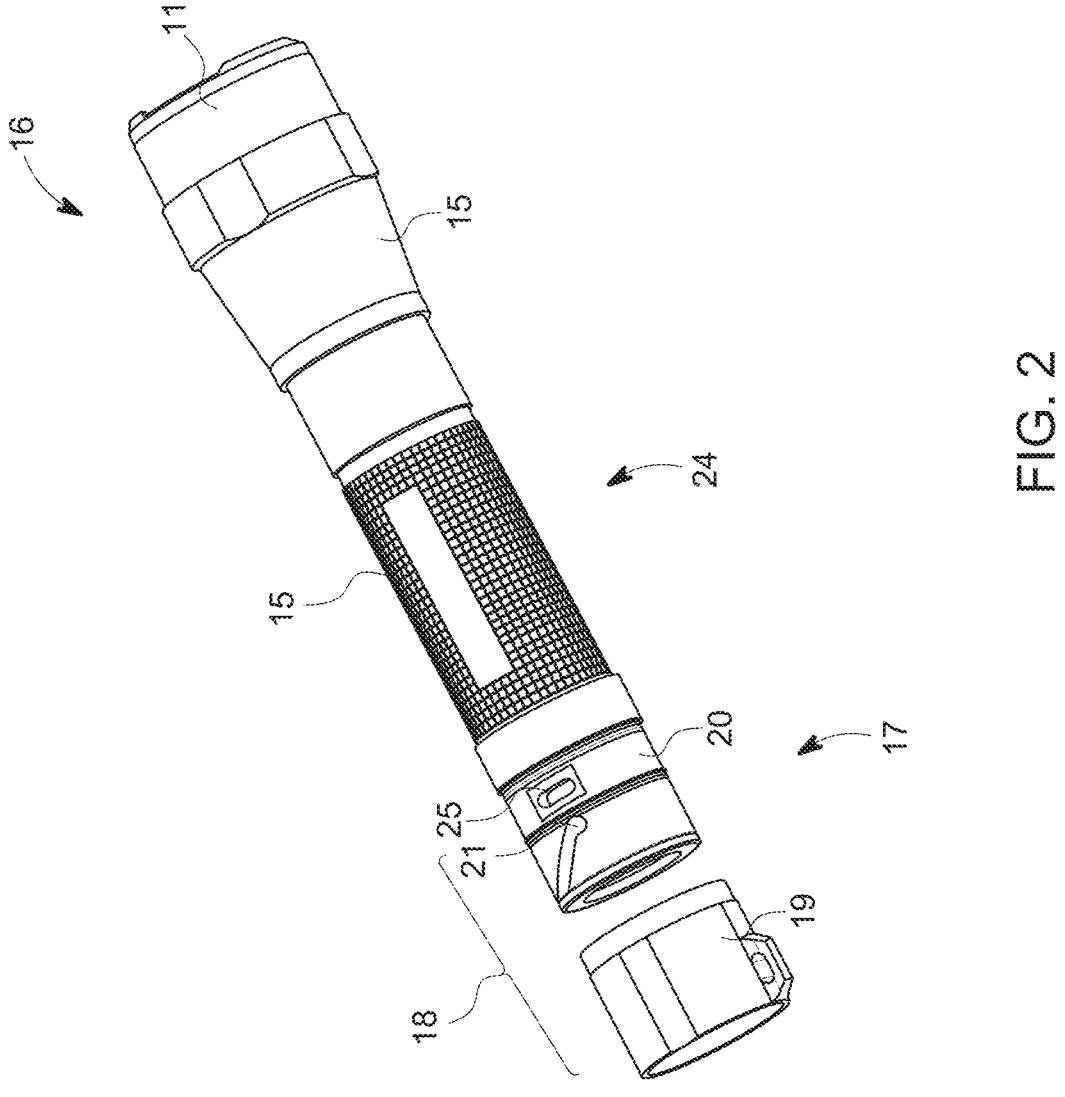
FIG. 2 is a perspective view of the handheld lighting device of FIG. 1 with an outer casing of an end cap assembly removed in accordance with one aspect of the technology.
Figure 3:
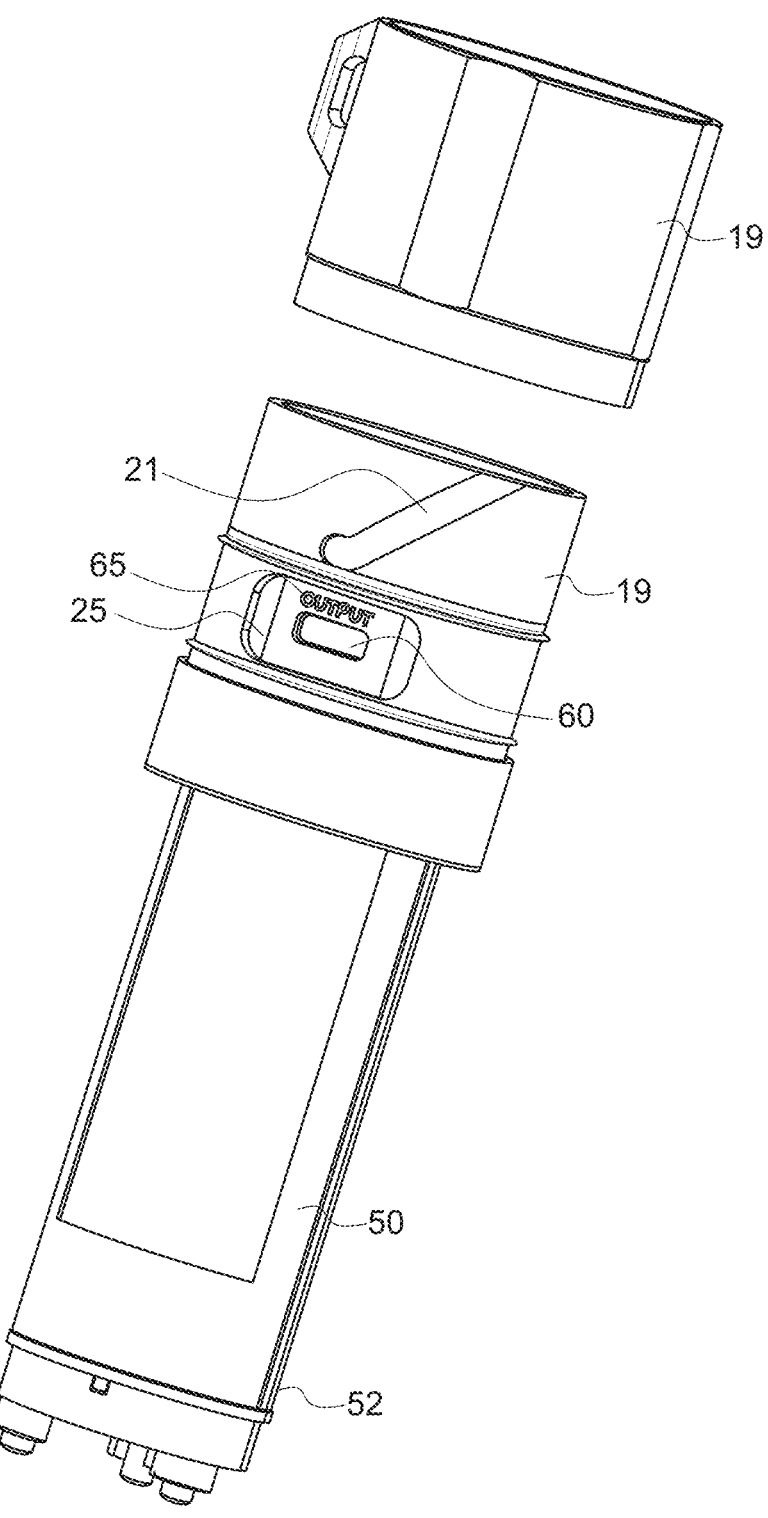
FIG. 3 is a side perspective view of a rechargeable power source located in an inner casing of an end cap assembly with the outer casing removed.
Figure 4:
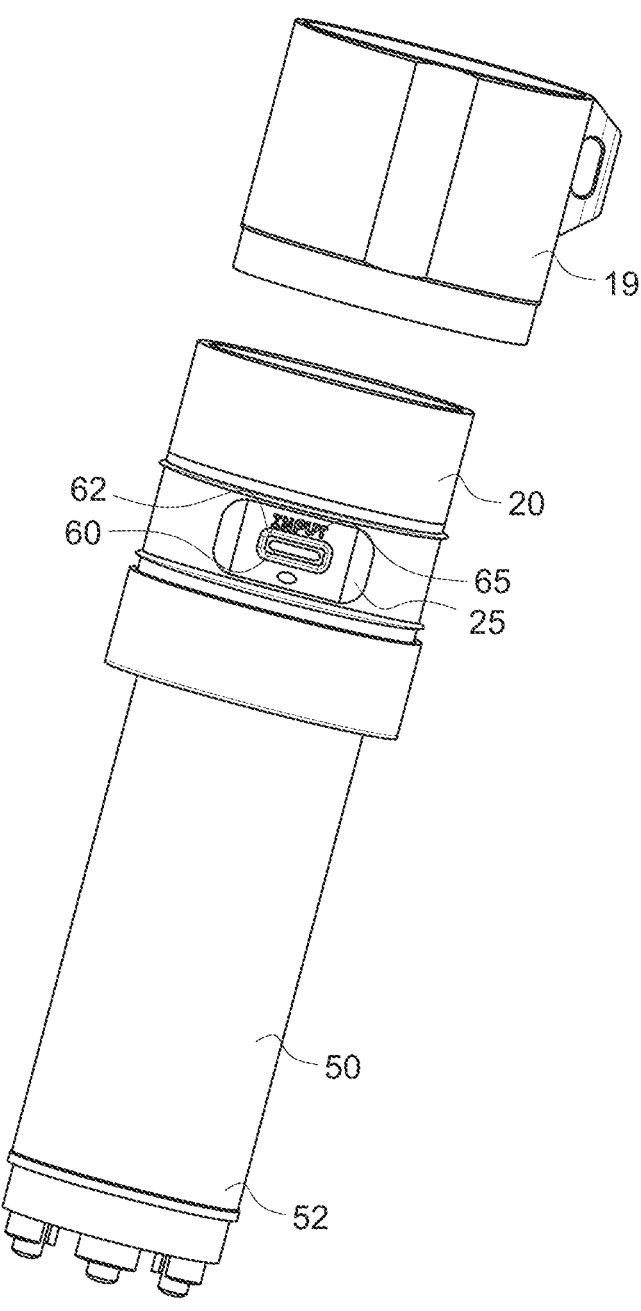
FIG. 4 is an opposite side perspective view of a rechargeable power source located in an inner casing of an end cap assembly with the outer casing removed.
Figure 5:
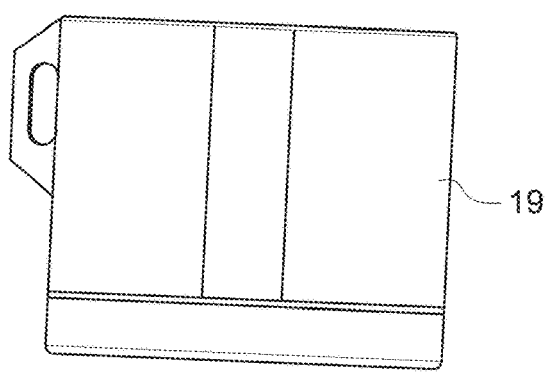
FIG. 5 is a side view of a portion of a rechargeable power source, an inner casing, and an outer casing of an end cap assembly.
Figure 5:
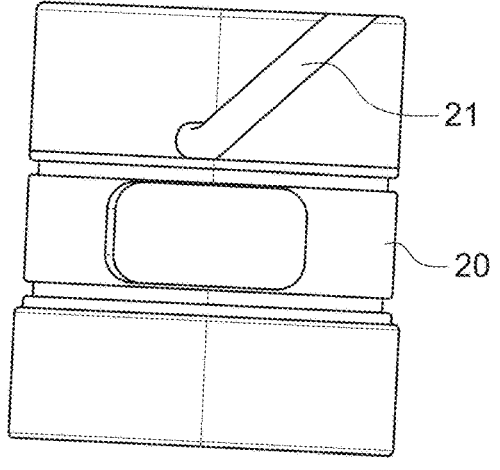
Figure 5:
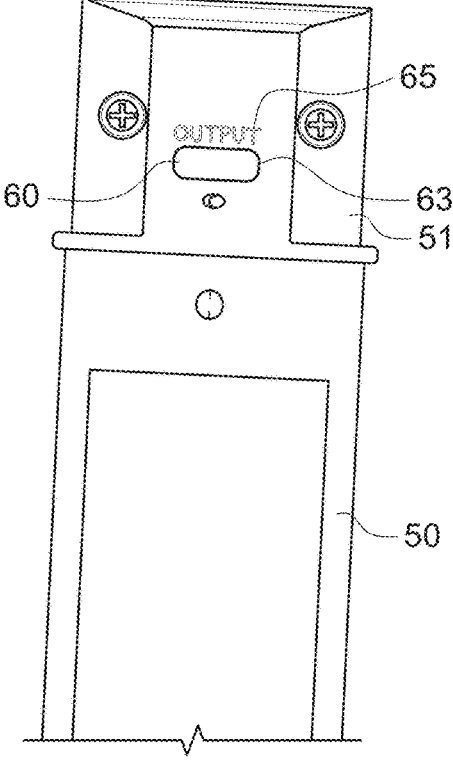
Figure 6:
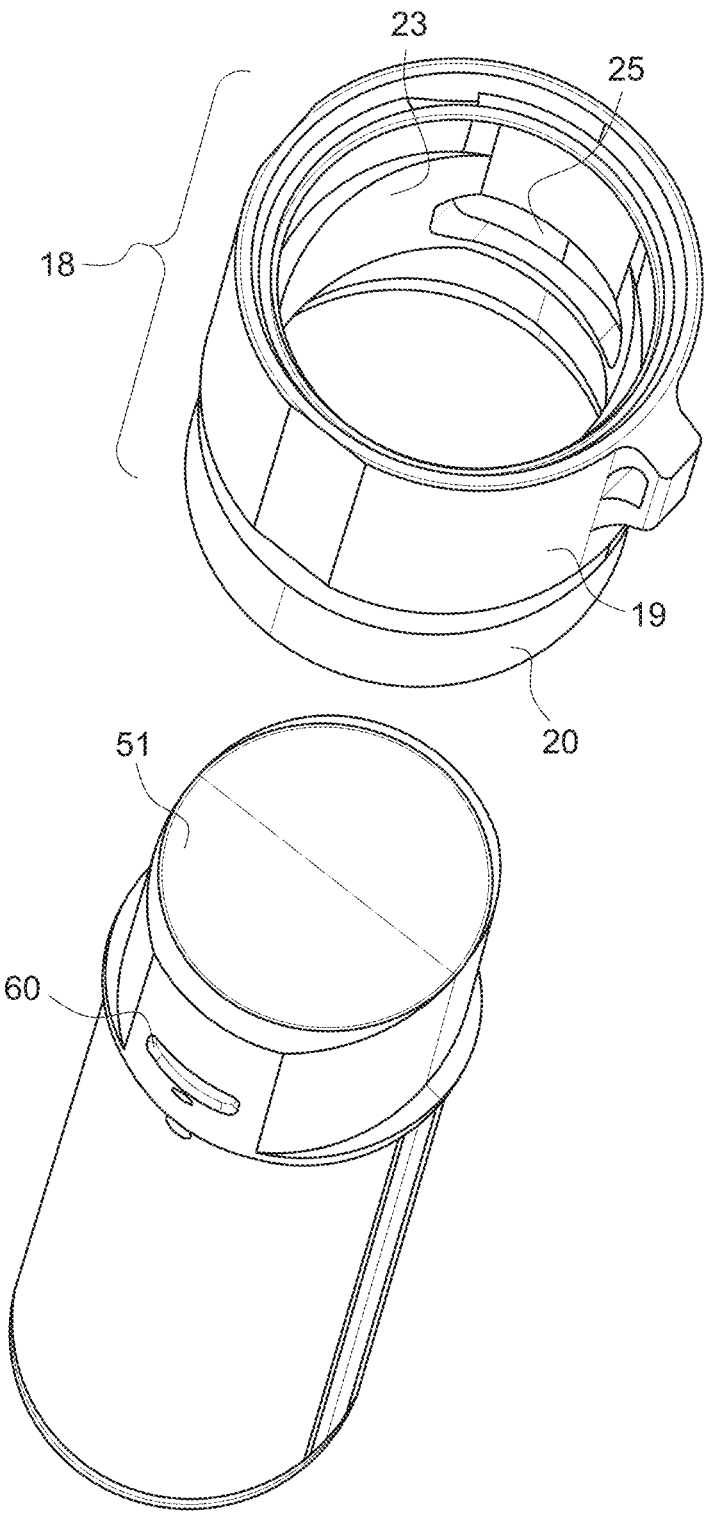
FIG. 6 is a perspective view of a rechargeable power source and a portion of an end cap assembly in accordance with one aspect of the technology.
Figure 7:
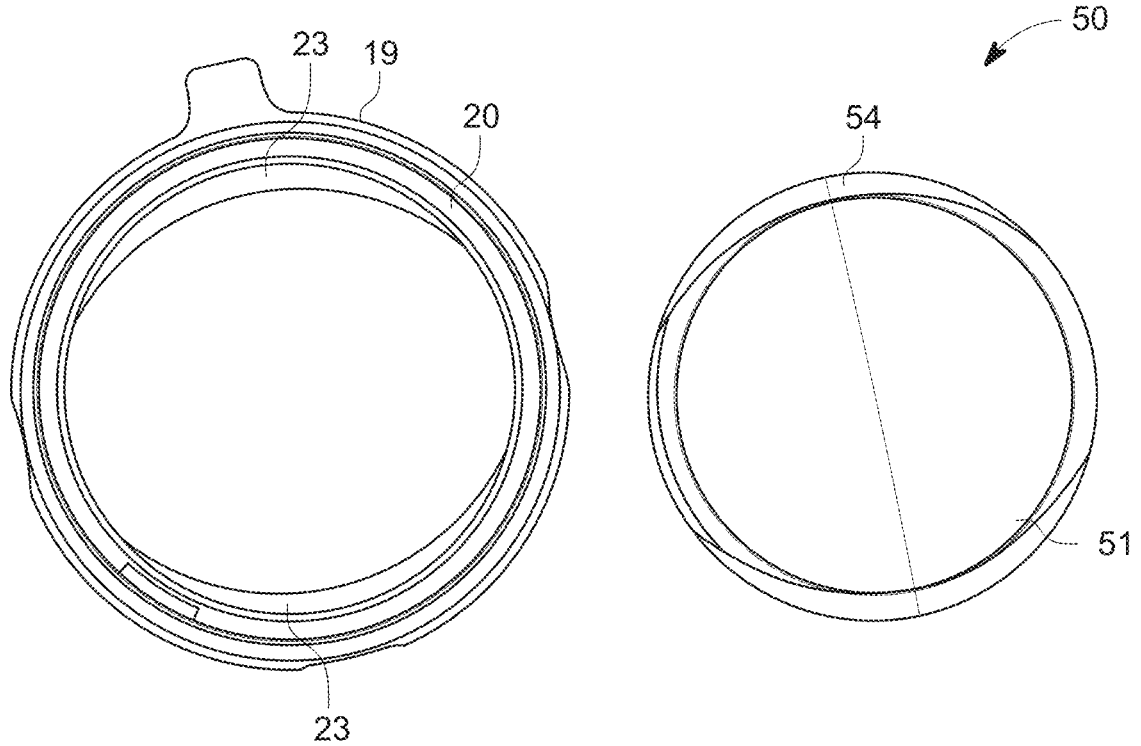
FIG. 7 is a side view of a rechargeable power source and a portion of an end cap assembly in accordance with one aspect of the technology.
Figure 8:
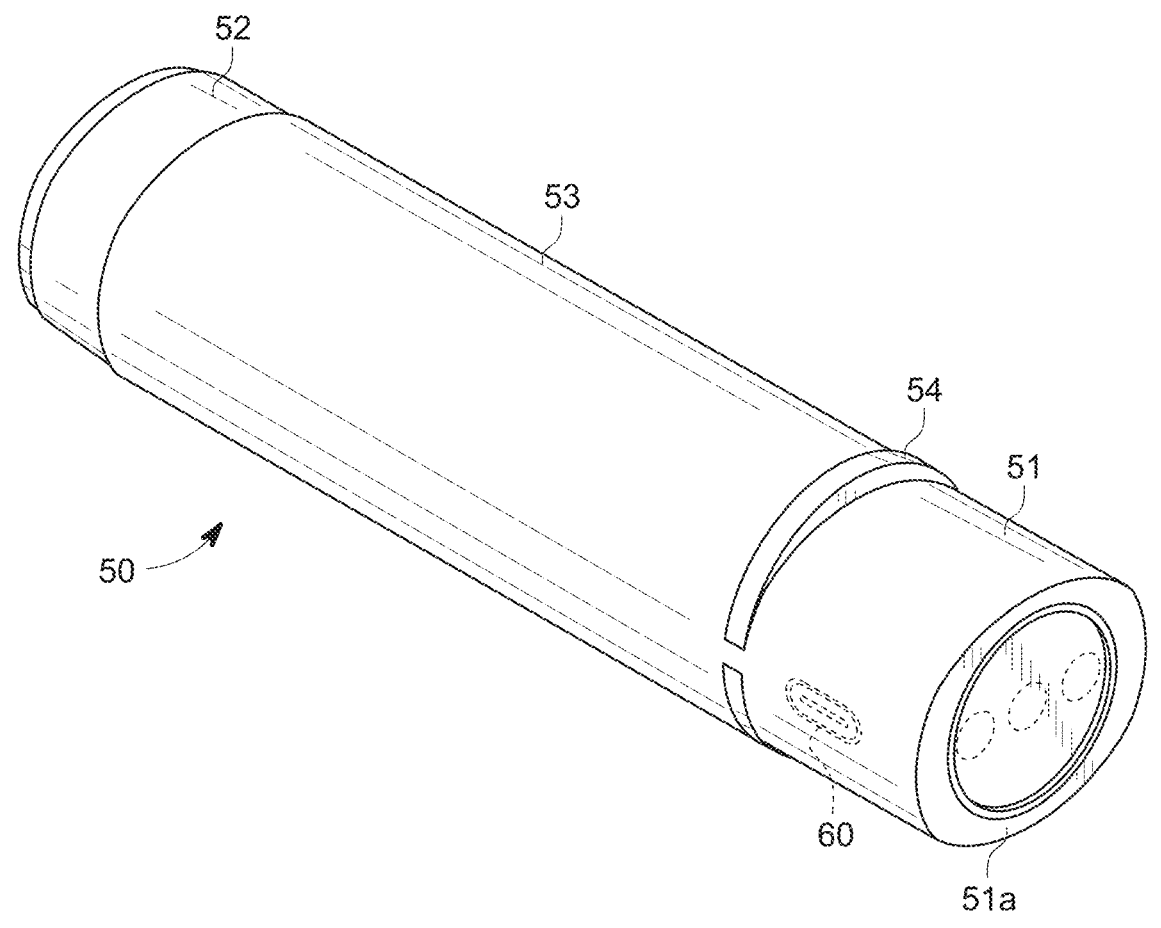
FIG. 8 is a perspective view of a rechargeable power source in accordance with one aspect of the technology.
Figure 9:
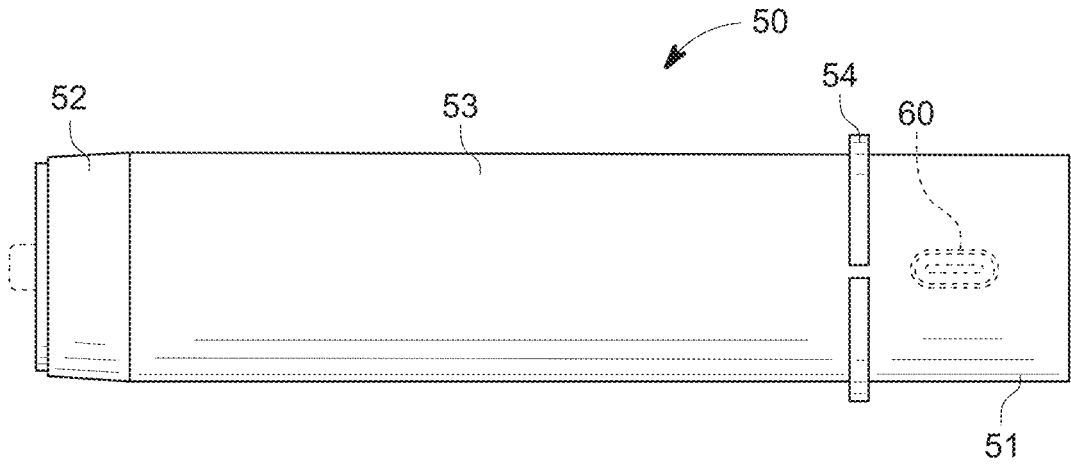
FIG. 9 is a side view of a rechargeable power source in accordance with one aspect of the technology.
Figure 10:
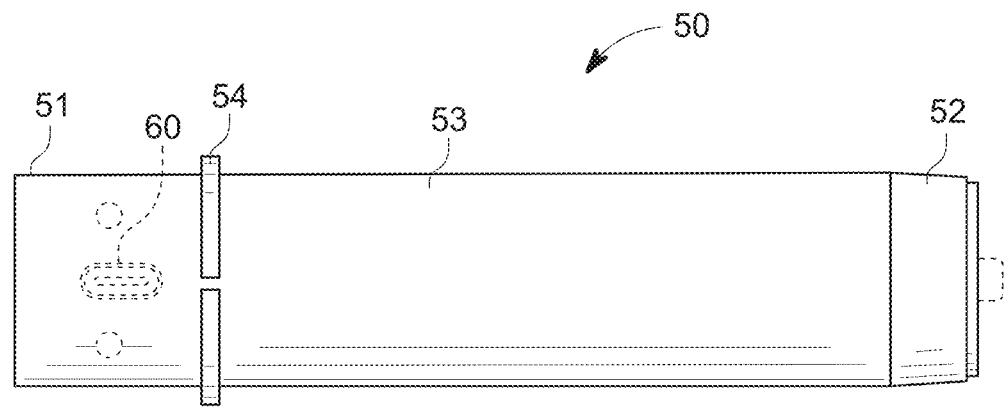
FIG. 10 is an opposite side view the rechargeable power source of FIG. 9.
Figure 11:
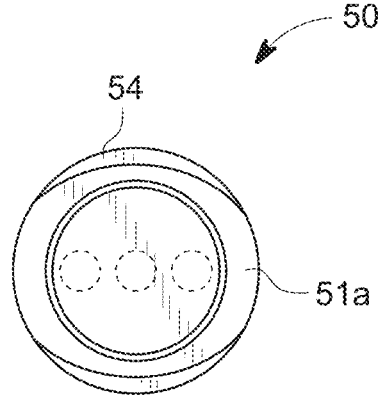
FIG. 11 is an end view of a rechargeable power source in accordance with one aspect of the technology.
Figure 12:
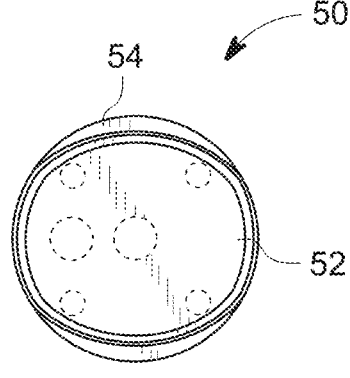
FIG. 12 is an opposite end view of a rechargeable power source of FIG. 11.

The following detailed description includes reference to the accompanying drawings, which form a part hereof and in which are shown, by way of illustration, exemplary embodiments. However, before the present technology is disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Although the following detailed description contains many specifics for the purpose of illustration, a person of ordinary skill in the art will appreciate that many variations and alterations to the following details can be made and are considered to be included herein.

Accordingly, the following embodiments are set forth without any loss of generality to, and without imposing limitations. Unless defined otherwise, all technical and scientific terms used herein have the same meaning as commonly understood by one of ordinary skill in the art to which this disclosure belongs.

As used in this specification, the singular forms "a," "an" and "the" include plural referents unless the context clearly dictates otherwise. Thus, for example, reference to "a line" includes a plurality of such lines.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term, like "comprising" or "including," in this specification it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The term "coupled," as used herein, is defined as directly or indirectly connected in a fluidic or non-fluidic manner.

Objects described herein as being "adjacent to" each other may be in physical contact with each other, in close proximity to each other, or in the same general region or area as each other, as appropriate for the context in which the phrase is used.

Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. Unless otherwise stated, use of the term "about" in accordance with a specific number or numerical range should also be understood to provide support for such numerical terms or range without the term "about". For example, for the sake of convenience and brevity, a numerical range of "about 50 angstroms to about 80 angstroms" should also be understood to provide support for the range of "50 angstroms to 80 angstroms."

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.8, 3, 3.1, 4, 4.6, and 5, individually.

This same principle applies to ranges reciting only one numerical value as a minimum or a maximum. Furthermore, such an interpretation should apply regardless of the breadth of the range or the characteristics being described.

As used herein, "enhanced," "improved," "performance-enhanced," "upgraded," "improvement," and the like, when used in connection with the description of a device, component, or process, refers to a characteristic of the device, component or process that provides measurably better form, function, or outcome as compared to previously known devices or processes. This applies both to the form and function of individual components in a device or process, as well as to such devices or processes as a whole.

Reference throughout this specification to "an example" means that a particular feature, structure, or characteristic described in connection with the example is included in at least one embodiment or aspect. Thus, appearances of the phrase "in an example" in various places throughout this specification are not necessarily all referring to the same embodiment or aspect of the technology.

EXAMPLE EMBODIMENTS

It should be understood that the aspects of the technology discussed herein are contemplated for use with a device that utilizes a rechargeable power source. For purposes of illustrating the various aspects of the methods and systems claimed herein, the discussion below will be primarily directed to describing exemplary embodiments directed to a rechargeable power source, such as a rechargeable battery used in a flashlight or other apparatus that uses a rechargeable battery with an end shaped to mate with a portion of the light source in one of a plurality of finite orientations. It should be noted, however, that the elements and principles discussed herein are applicable to other applications, including, but without limitation, headlamps, cameras, or any other device that may benefit from aspects of the technology described herein. It is also noted that discussion of methods and systems herein can be interchangeable with respect to specific aspects. In other words, specific discussion of one apparatus, method, or system (or components thereof) herein is equally applicable to other aspects as they relate to the system, apparatus, or methods, and vice versa.

An initial overview of technology aspects is provided below and specific technology aspects are then described in further detail. This initial summary is intended to aid readers in understanding the technology more quickly, but is not intended to identify key or essential technological features, nor is it intended to limit the scope of the subject matter. In particular, aspects of the technology are directed towards a light source having a body with a cavity, the rechargeable power source disposed within the body. The rechargeable power source has a first end and a second end. The first end of the rechargeable power source comprises a symmetric shape with a plurality of finite radial orientations. The first end has a shape corresponding to the symmetric shape of the rechargeable power source.

In one aspect of the technology, the first end comprises one or more charging ports disposed on a lateral side of the first end. An opening is disposed in the body of the light source that corresponds to at least one side of the first side of the rechargeable power source. In one aspect, an indicia or indicium of the type of charging port that is disposed on the rechargeable power source on a side of the power source and positioned such that when the charging port is positioned within the opening in the body of the light source, the indicia or indicium is viewable through the opening. Advantageously, irrespective of the orientation of the rechargeable power source, the power source is fixed in one of the plurality of finite number of radial orientations within the body of the light source and fixed in a position so that the one or more ports are aligned within an opening in the body.

With reference now to FIGS. 1-7, one aspect of the technology provides for a light source 10 with a rechargeable power source 50 (e.g., a battery) disposed therein and particularly a handheld light source. However, it is understood that aspects of the technology described herein are applicable to any device that employs a rechargeable power source. In one aspect, the handheld light source comprises an elongate body 15 having a first end 16 and a second end 17. The body 15 of the light source may comprise any number of different types of materials, including metal, plastic, or any other material that may be cast, molded, or formed into a durable shape to house lighting and power components therein. The first end 16 of the lighting device 10 comprises a head 11 having a light assembly disposed therein. The light assembly comprises a device capable of propagating a beam of light therefore in a direction that is parallel with a longitudinal axis of the body 15. A second end of the body 15 comprises an end cap assembly 18. The end cap assembly 18 comprises a moveable or slidable outer covering 19 or casing that is moveable with respect to an inner portion or casing 20 of the end cap assembly 18. In one aspect of the technology, the inner portion 20 comprises a groove 21 configured to mate with a post or tab disposed about an internal portion of the outer covering 19. As the outer covering or casing 19 is rotated with respect to the inner casing 20 of the end cap assembly 18, the casing 19 is moved in a downward axial direction away from the end cap assembly 18 exposing a portion of the inner casing 20.

In one aspect of the technology, the inner portion or inner casing 20 comprising one or more port openings 25. The port openings 25 pass through the inner casing and into a cavity within the body 15 of the device 10. In one aspect of the technology, the groove 21 is oriented in a curvilinear or helix shaped. In other aspects of the technology, the groove is rectilinear and disposed at an oblique angle with respect to the longitudinal axis of the body 15 or at non-oblique angles. In another aspect, the outer casing 19 comprises one or more windows. As the outer casing 19 is rotated about the inner casing 20, the window(s) may be aligned with the port opening(s) 25. In other words, the slidable outer casing 19 has a first configuration where the port openings 25 are covered and a second configuration where the port openings are uncovered or exposed.

In another aspect of the technology, the port openings 25 are always in an exposed state. Meaning, there is no outer casing 19 covering the port openings 25. While an end cap assembly 18 is referenced herein, it is understood that the inner casing 20 and outer casing 19 arrangement may be located on any part of the body 15 of the handheld light 10.

Meaning, the moveable outer casing 19 may be located on the end cap assembly 18, near a middle portion 24 of the body, or any other portion wherein a designer may wish to locate an exposable port opening 25 in accordance with aspects of the technology herein.

In one aspect of the technology, the body 15 of the lighting device 10 houses a rechargeable power source 50, such as a battery or a battery pack. The battery may include a sleeve of one or more cells therein and may comprise a lithium ion, nickel cadmium, or other battery source. In the aspect of the technology, where the power source 50 comprises a battery pack, one or more smaller rechargeable batteries are disposed within a sleeve or housing. The housing has a charging port 60 and first end 51 with a symmetrical shape having a finite number of radial orientations within a similarly shaped opening in the body 15. In one aspect of the technology, the power source 50 has a first end 51 and a second end 52. Each of the first end 51 and second end 52 comprise two terminals (e.g., positive or negative terminals) for coupling with the lighting device 10. The terminal may be recessed either in the first end 51 or the second end 52, and/or protruding on either the first end 51 or second end 52, so long as the power source 50 couples to the lighting device 10 and to create a circuit for providing power to the device.

In one aspect of the technology, the power source 50 has a first end 51 comprising a non-circular symmetrical shape. For example, the first end 51 may have an oval or other shape including, but without limitation, a triangle, square, rectangular, diamond, etc. In one aspect of the technology, the end cap assembly 18 comprises an inner portion 23 or internal ridge 23 that is shaped to receive and mate with the shape of the first end 51 of the power source 50. Meaning, if the first end 51 has an oval shape, the inner portion 23 or internal ridge of end cap assembly 18 will have a corresponding oval shape. In this manner, the power source 50 has a plurality of finite radial orientations in which it may be positioned within the body 15 of the lighting device 10. While a ridge 23 is disclosed, it is understood that any shape and combination of structures that accommodate the first end 51 and limits the radial orientation of the same is contemplated for use in connection with the technology disclosed herein. In one aspect, the entire power source 50 is configured to be centered within a cavity of the lighting device 10. The inner portion 23 that is shaped to receive the first end 51, is likewise centered within the end cap assembly 18. Advantageously, the centering assists in the alignment of charge ports 60 with port openings 25. In this manner, when the end 52 is disposed within the lighting device 10, it is freely rotatably within the device. When the first end 51 is inserted into the end cap assembly 18 and the end cap assembly 18 is coupled to the body 15 of the lighting device, the power source 50 is no longer rotatable and charge ports 60 on multiple sides of the first end 51 are placed in an orientation where they are equidistant from one another, and equidistant to a respective charge port opening 25. In an alternative arrangement, the first end 51 is disposed within the body 15 and not the end cap assembly 18. The inner portion 23 that corresponds to the shape of the first end 51, in that aspect, would not necessarily be located in the end cap 18. In that arrangement, the power source 50 would not be free rotatably in an unlimited number of radial orientations.

In the case of an oval or rectangular shape, for example, the power source 50 has two possible radial orientations. In the case of a triangle, the power source 50 has three possible orientations. In the case of a square, there are four, in the case of a six-point star, for example, there are six, etc. Advantageously, a user need not fumble around with a power source 50 that only has one unique way in which the power source 50 can couple with the lighting device 10 and struggle to fit the power source 50 within the cavity of the body 15 like a puzzle piece, risking damage to the power source 50 and/or the internal portions of the light source 10 in the process.

In one aspect of the technology, one or more sides of the first end 51 of the power source 50 comprises a charging port 60. For example, the charging port 60 may be a USB (type A, B, C, mini, micro, lightning, etc.) or other port that is configured to receive or transmit a charge. In one aspect, the charging port 60 is a dual functioning charging port that can either accept a charge from an external source and recharge the rechargeable power source 50 or it can act as a source to charge an external device (e.g., a phone, table, or other rechargeable battery). In another aspect of the technology, first end 51 of the power source 50 comprises a plurality of charging ports 60, each port comprising either a receiving port (intended to receive a charge and recharge the power source 50) or a transmitting port for charging a tertiary device. In either case, an indicator 65 of which type of charging port 60 is disposed on the first end 51 of the power source is noted adjacent the charging port 60 itself. For example, in one aspect of the technology, where the charging port 60 comprises a receiving port 62, the word "INPUT" is located adjacent the charging port 60. In an aspect where the charging port comprises a transmitting port 63, the word "OUTPUT" is located adjacent the charging port 60. Other indicia (e.g., IN or OUT, etc.) may be used as suits a particular purpose. Other indicia may include, but is not limited to, USB PD, IN/OUT, CHARGE, POWER BANK, etc.

In one aspect of the technology, the charging port 60 on the side of the first end 51 of the power source 50 is oriented such that when the first end 51 of the power source 50 mates with the end cap assembly 18 (or other portion of the body shaped to receive the symmetric end of the power source), the charging ports 60 are aligned with the port openings 25. The port openings 25 pass through the entire body 15 of the lighting device 10 and are sized large enough to allow a charging device to be disposed within the respective charging port 60 and to display the charging port indicator 65. Advantageously, no matter which of the plurality of finite orientations that the user places the power source 50 within the body 15 of the lighting device 10, the charging port 60 will align with a port opening 25 and indicate to the user what type of charge port 60 is associated with any particular charge port opening 25.

Advantageously, this eliminates the need for the user to rely on a keying feature to place the power source 50 with exactness, while also allowing the user to align a charging port 60 with any port opening 25 corresponding to the location of the charging port 60 on the side of the first end 51 of the power source 50. In other words, there are a plurality of finite radial orientations that the power source 50 will fit within the body 15 of the device. But, at least in the aspect of the oval and rectangular shape, each of the plurality of finite orientations will have a port opening 25 located through the body 15 in a position that aligns with a charging port 60 when the power source 50 is disposed within the body 15 of the lighting device 10. In a square or rectangular-shaped first end 51, there may or may not be an exact number of port openings 25 corresponding to the finite number of radial orientations. Meaning, there may or may not be three (triangular) or four (square) port openings. In the aspect of the rectangular shaped first end 51, there may be two or more port openings corresponding to two or more charging ports 60 as desired.

Figure 13:
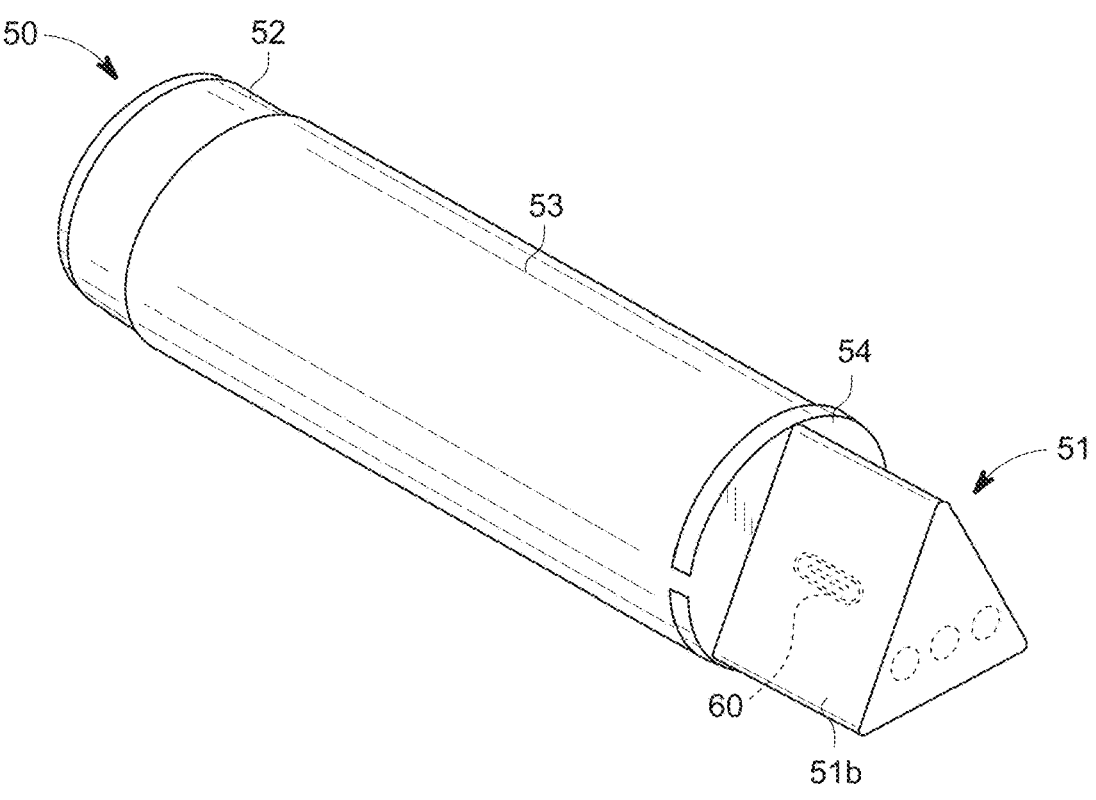
FIG. 13 is a perspective view of a rechargeable power source in accordance with one aspect of the technology.
Figure 14:
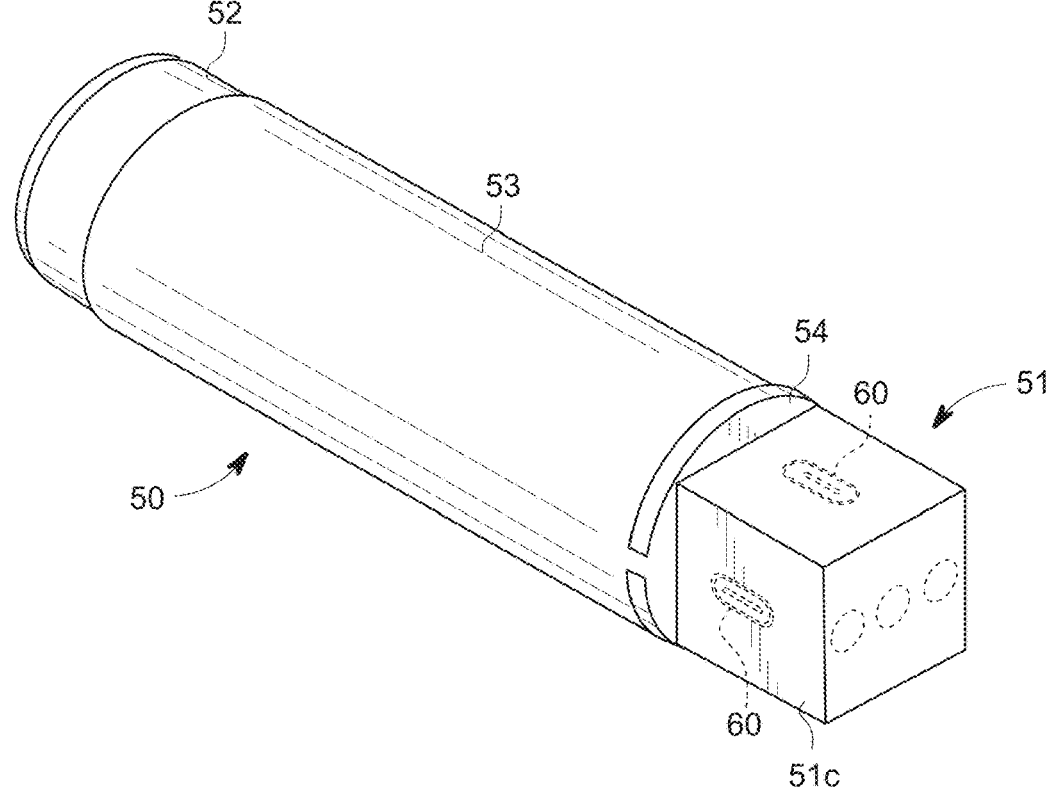
FIG. 14 is a perspective view of a rechargeable power source in accordance with one aspect of the technology.
Figure 15:
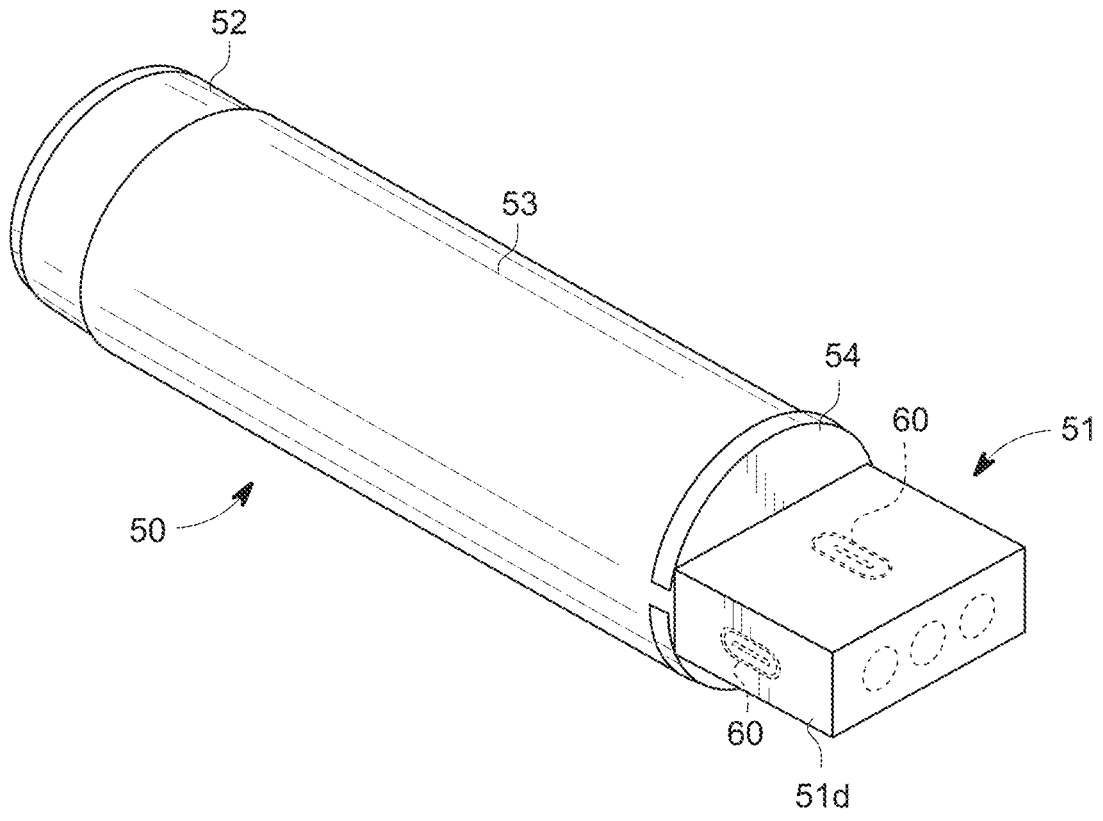
FIG. 15 is a perspective view of a rechargeable power source in accordance with one aspect of the technology.

With reference generally to FIGS. 1-7, but more specifically to FIGS. 8-14, in one aspect of the technology, the rechargeable power source 50 is elongate and comprises a generally cylindrical body 53 with a cylindrical second end 52. A ridge 54 is disposed about an exterior of the body 53 near a first end 51. In one aspect, ridge 54 delineates the first end 51 from the remainder of the body 53 of the power source 50. In one aspect of the technology, when the first end 51 of the power source 50 is disposed within the end cap assembly 18, the ridge 54 is butted against or mated with an internal ridge 23 within the end cap assembly 18. The internal ridge 23 is shaped to approximate the shape of the first end 51 of the power source 50 so that it may pass through the internal ridge 23. In another aspect, the ridge 54 is butted against an internal ridge within another internal portion of the body 15 of the lighting device 10. For example, the first end 51 is disposable in a mid-portion of the body 15 while the second end 52 is disposed in the end cap assembly 18. FIGS. 8-12, in accordance with one aspect of the technology, disclose a first end 51*a* having a symmetrical generally oval shape. A charging port 60 is disposed on opposing sides of the oval first end 51*a* corresponding to port openings 25 through the body 15. It is understood, however, that the charging ports 60 may be disposed on a first side of the oval and on an adjacent side, so long as the port openings through the body 15 of the lighting device 10 are likewise situated on a first and adjacent second side. Moreover, the charging ports 60 may be oriented with a longitudinal axis that is parallel with a longitudinal axis of the rechargeable power source 50 or that is normal, or at an oblique angle with respect to the longitudinal axis of the power source 50. With reference to FIGS. 13-15, in accordance with different aspects of the technology, the first end 51*b* of the power source 50 is triangular, the first end 51*c* of the power source 50 is generally square, or the first end 51*d* of the power source 50 is rectangular.

While reference is made herein to a power source 50 with a first end 51 having a specific symmetrical geometry with a finite number of radial orientations and a second end 52 that is generally circular with a generally infinite number of radial orientations, it is understood that in one aspect of the technology, the entire power source 50 comprises a specific symmetrical geometry with a finite number of radial orientations. Meaning, the entire power source 50 is oval, or triangular, or rectangular, etc.

Reference is made herein of a power source 50 to be used with a lighting device 10, including a hand-held lighting device. It is understood that the power source 50 and the principles of its design, are useable in connection with any number of lighting devices or devices that can benefit from a removable and/or rechargeable power device. This includes, without limitation, work lights, headlamps, and lighting devices of many different shapes and sizes. It also includes other devices such as portable radios, power stations, heating devices, cooling devices, fans, tools, and the like.

The above description provides numerous specific details for a thorough understanding of the embodiments described herein. However, those of skill in the art will recognize that one or more of the specific details may be omitted, or other methods, components, or materials may be used. In some cases, operations are not shown or described in detail. Furthermore, the described features, operations, or characteristics may be combined in any suitable manner in one or more embodiments. It will also be readily understood that the order of the steps or actions described in connection with the embodiments disclosed may be changed as would be apparent to those skilled in the art.

As will be appreciated by one skilled in the art, aspects of the present technology may be embodied as a system, method or used with a computer program product as part of control circuit for providing power to a lighting device, or any other device that may use the rechargeable power source described herein. Accordingly, aspects of the present technology may take the form of an entirely hardware embodiment, an entirely software embodiment (including firmware, resident software, micro-code, etc.) or an embodiment combining software and hardware aspects that may all generally be referred to herein as a "circuit," "module" or "system."

The foregoing detailed description describes the technology with reference to specific exemplary embodiments. However, it will be appreciated that various modifications and changes can be made without departing from the scope of the present disclosure. The detailed description and accompanying drawings are to be regarded as merely illustrative, rather than as restrictive, and all such modifications or changes, if any, are intended to fall within the scope of the present disclosure as described and set forth herein.

The invention claimed is:

1. A light with a rechargeable power source, comprising:
a light source having a body with a cavity, the rechargeable power source disposed within the body;
the rechargeable power source having a first end, a generally cylindrical body, and a second end, the first end of the rechargeable power source comprising a non-circular symmetric shape different from the generally cylindrical body and with a plurality of finite orientations shaped to fit into a portion of the cavity of the body, wherein the portion of the cavity of the body is shaped to correspond to the symmetric shape of the rechargeable power source.

2. The light source of claim 1, wherein the rechargeable power source comprises an external ridge disposed about an exterior portion of the power source.

3. The light source of claim 2, wherein the portion of the body of the light source comprises an internal ridge disposed about an interior portion of the body, said internal ridge configured to mate with the external ridge of the rechargeable power source.

4. The light source of claim 3, wherein when the internal ridge of the light source is mated with the external ridge, longitudinal movement of the rechargeable power source is limited.

5. The light source of claim 1, wherein the first end of rechargeable power source is shaped to approximate an oval.

6. The light source of claim 5, wherein the first end of the rechargeable power source comprises a power input port and a power output port.

7. The light source of claim 6, wherein the first end of the rechargeable power source comprises an indicia of power input adjacent the power input port and an indicia of power output adjacent the power output port.

8. The light source of claim 7, wherein the body of the light source comprises a first opening configured to display the indicia of power input and the power input port, and a second opening configured to display the indicia of power out and the power output port.

9. The light source of claim 7, further comprising a cover disposed about the body of the light source and configured to slide about an exterior of the body of the light source to reveal the first and second openings.

10. A rechargeable power source, comprising:
an elongate
rechargeable battery having a first end, a generally cylindrical body, and a second end; the first end of the elongate battery comprising a non-circular symmetric shape different from the generally cylindrical body and with a plurality of finite orientations, said symmetric shape configured to mate with a corresponding symmetric shape located within a device powered by the rechargeable power source.

11. The rechargeable power source of claim 10, wherein the first end of the rechargeable battery is shaped to approximate an oval, a triangle, or a rectangle.

12. The rechargeable power source of claim 10, wherein the first end comprises a plurality of power ports.

13. The rechargeable power source of claim 12, wherein one of the plurality of power ports is a power input port and one of the plurality of power ports is a power output port.

14. The rechargeable power source of claim 13, further comprising a power output indicia adjacent the output power port and a power input indicia adjacent the input power port.

15. The rechargeable power source of claim 10, further comprising a ridge partially circumscribing an exterior of the rechargeable power source.

16. A hand-held light with a rechargeable power source, comprising:
an elongate body with a light source disposed about a distal end of the elongate body;
the elongate body having a cavity disposed about a proximal end, said cavity configured to receive a power source therein;
the rechargeable power source disposed within the cavity;
the rechargeable power source having a first end, a generally cylindrical body, and a second end, the first end of the rechargeable power source comprising a non-circular symmetric shape different from the generally cylindrical body and with a plurality of finite orientations; and
wherein a portion of the cavity of the body is shaped to approximate the symmetric shape of the first end of the rechargeable power source and is configured to receive the first end of the rechargeable power source therein.

17. The hand-held light of claim 16, wherein the rechargeable power source comprises a power input port and a power output port disposed about different sides of the first end of the symmetric shape of the rechargeable power source.

18. The hand-held light of claim 16, further comprising a plurality of openings in the elongate body corresponding to the location of the first end of the rechargeable power source when the rechargeable power source is fully placed within the cavity of the body.

19. The hand-held light of claim 18, further comprising a slidable cover mounted about an exterior of the hand-held light.

20. The hand-held light of claim 19, wherein the slidable cover has a first configuration wherein it is covering the plurality of openings disposed about the elongate body and a second configuration wherein it is not covering the plurality of openings disposed about the elongate body.

* * * * *